(12) United States Patent
Vick et al.

(10) Patent No.: US 7,418,630 B1
(45) Date of Patent: Aug. 26, 2008

(54) METHOD AND APPARATUS FOR COMPUTER SYSTEM DIAGNOSTICS USING SAFEPOINTS

(75) Inventors: Christopher A. Vick, San Jose, CA (US); Lawrence G. Votta, Sammamish, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 11/220,507

(22) Filed: Sep. 7, 2005

Related U.S. Application Data (60) Provisional application No. 60/694,171, filed on Jun. 27, 2005.

(51) Int. Cl.
*G06F 11/00* (2006.01)
(52) U.S. Cl. .......................... 714/34; 714/35
(58) Field of Classification Search .................. 714/34, 714/35
See application file for complete search history.

(56) References Cited

U.S. PATENT DOCUMENTS

| | | | |
|---|---|---|---|
| 6,523,059 B1* | 2/2003 | Schmidt | 718/100 |
| 6,842,853 B1* | 1/2005 | Bush et al. | 712/228 |
| 7,013,454 B2* | 3/2006 | Bush et al. | 717/124 |
| 7,080,374 B2* | 7/2006 | Dahlstedt et al. | 718/1 |
| 7,086,053 B2* | 8/2006 | Long et al. | 718/100 |
| 7,114,097 B2* | 9/2006 | McLamb et al. | 714/20 |
| 2001/0054057 A1* | 12/2001 | Long et al. | 709/108 |
| 2004/0148603 A1* | 7/2004 | Baylis | 718/100 |
| 2005/0289414 A1* | 12/2005 | Adya et al. | 714/724 |
| 2006/0294435 A1* | 12/2006 | Vick et al. | 714/38 |
| 2007/0136402 A1* | 6/2007 | Grose et al. | 707/206 |

OTHER PUBLICATIONS

Agarwal, Saurabh, Garg, Rahul, Gupta, Meeta S., and Moreira, Jose E., "Adaptive Incremental Checkpointing for Massively Parallel Systems", ICS 2004, 10 pages.
Petrini, Fabrizio, Davis, Kei and Sancho, Jose Carlos, "System-Level Fault-Tolerance in Large-Scale Parallel Machines with Buffered Coscheduling", 18th International Parallel and Distributed Processing Symposium (IPDPS'04), Apr. 26-30, 2004, 8 pages.
Elnozahy, E. N., Plank, J. S. and Fuchs, W.K., "Checkpointing for Peta-Scale Systems: A Look into the Future of Practical Rollback-Recovery", IEEE Transactions on Dependable and Secure Computing, vol. 1, No. 2, Apr.-Jun. 2004, 12 pages.
Bronevetsky, Greg, Marques, Daniel, Pingalli, Keshav and Stodghill, Paul, "Automated Application-level Checkpointing of MPI Programs", Proceedings of the ninth ACM SIGPLAN symposium on Principles and practice of parallel programminng, 2003, 11 pages.

(Continued)

*Primary Examiner*—Christopher S McCarthy
(74) *Attorney, Agent, or Firm*—Osha-Liang LLP (57) ABSTRACT

A method for safepointing a system that includes receiving a stop command by an executing thread from a master, wherein the executing thread executes an operating system, continuing execution of the executing thread until a safepoint is reached after receiving the stop command, halting execution of the executing thread at the safepoint; and evaluating a response from the executing thread to diagnosis the system.

27 Claims, 8 Drawing Sheets

OTHER PUBLICATIONS

Tuthill, B., Johnson, K., Wilkening, S. and Roe, D. "IRIX Checkpoint and Restart Operation Guide", Silicon Graphics, Inc. Mountain View, Ca, 1999, 63 pages.

Plank, James S., "An Overview of Checkpointing in Uniprocessor and Distributed Systems, Focusing on Implementation and Performance", Technical Report of University of Tennessee, Jul. 1997, 20 pages.

Kavanaugh, Gerard P. and Sanders, William H., "Performance Analysis of Two Time-Based Coordinated Checkpointing Protocols", In 1997 Pac.Rim Int.Sympo. on Fault-Tol. Systmes, Dec. 1997, 8 pages.

Elnozahy, E.N., Alvisi, Lorenzo, Wang, Yi-Min and Johnson, David B., "A Survey of Rollback-Recovery Protocols in Message-Passing Systems", Technical Report, Carnegie Mellon Univ., Oct. 1996, 42 pages.

Koo, Richard and Toueg, Sam, "Checkpointing and Rollback-Recovery for Distributed Systems", IEEE Transactions on Software Engineering, vol. SE-13. No. 1, 1987, 9 pages.

Chandy, K. Mani and Lamport, Leslie, "Distributed Snapshots: Determining Global States of Distributed Systems", In ACM Transactions on Computer Systems, 3(1), Aug. 1985, 13 pages.

* cited by examiner

METHOD AND APPARATUS FOR COMPUTER SYSTEM DIAGNOSTICS USING SAFEPOINTS

CROSS-REFERENCE TO RELATED APPLICATIONS

This application claims benefit under 35 U.S.C. § 119(e) of U.S. Provisional Application Ser. No. 60/694,171 filed on Jun. 27, 2005.

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical distributed computer system includes several interconnected nodes. The nodes may communicate by the use of messages, shared memory, etc. Through communication, nodes in a distributed computer system are able to provide greater functionality. For example, the distributed computer system may be used for communication between users, solving computationally hard problems, dividing tasks between nodes to provide greater throughput (e.g., a web server accessing a database server), etc.

Occasionally, one or more nodes in the distributed computer system may fail. The failure of a node may be attributed to the hardware failing or the software failing. For example, hardware failure may occur, when the processor crashes, upon failure to transmit data (e.g., transmit messages, data to and from storage, etc.), etc. Likewise, software failure may occur when the module of an application or the operating system fails to execute properly (or as expected). For example, an application or operating system thread may execute an infinite loop, several threads waiting for resources may cause deadlock, a thread may crash, etc.

Managing a distributed computer system when failure occurs involves detecting a failure has occurred and recovering from the failure before the entire distributed computer system crashes. Detecting when a failure may occur involves determining whether the nodes in the distributed computer system are still operating.

One method for detecting a failure in hardware includes having each node in the distributed computer system send a heartbeat messages to the other nodes at regular time intervals. Using the heartbeat method, at the specific time interval, the currently executing process is swapped out and the node sends the heartbeat.

Another method for detecting a failure in hardware is for a master node to send a stop thread call with a command to respond to a child node. When the child node receives the stop thread call, the child node immediately stops whatever thread is executing, regardless of whether the thread is in a critical section, and responds to the master node indicating that the child node has stopped. Accordingly, when the master node receives the message, the master node is assured that the hardware on the child node is executing well enough to send the response.

Detecting a failure in the software executing on the node requires a method for determining whether a thread is executing an infinite loop, a deadlock is resulting from several threads waiting for resources, a thread crashed, etc. Accordingly, detecting failure of the software can be more challenging than detecting failure in hardware.

SUMMARY

In general, in one aspect, the invention relates to a method for safepointing a system that includes receiving a stop command by an executing thread from a master, wherein the executing thread executes an operating system, continuing execution of the executing thread until a safepoint is reached after receiving the stop command, halting execution of the executing thread at the safepoint; and evaluating a response from the executing thread to diagnosis the system.

In general in one aspect, the invention relates to a system for safepointing that includes a plurality of subordinates configured to receive a stop command, continue execution until reaching a safepoint after receiving the stop command, halt execution at the safepoint, and forwarding a response if the stop command is processed, and a master configured to send the stop command to a subordinate in the plurality of subordinates, wherein the subordinate is an operating system thread, and determine whether the response is received from each subordinate in the plurality of subordinates, wherein the response from each subordinate is evaluated to diagnosis the system.

In general, in one aspect, the invention relates to a distributed system having a plurality of nodes that includes a plurality of subordinates configured to receive a stop command, continue execution until reaching a safepoint after receiving the stop command, halt execution at the safepoint, and forwarding a response if the stop command is processed, and a master configured to send the stop command to a subordinate in the plurality of subordinates, wherein the subordinate is an operating system thread, and determine whether the response is received from each subordinate in the plurality of subordinates, wherein the response from each subordinate is evaluated to diagnosis the system.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for diagnosing a computer system. Specifically, embodiments of the invention use a cooperative system to detect whether failure has occurred. More specifically, embodiments of the invention create a safepoint on each thread of each node that may be used to detect a hardware and software failure.

In one embodiment of the invention, a safepoint is a point in the execution of a node or thread in which the node or thread may stop and certain invariants are true. An invariant corresponds to a property or a rule that, when applied to an object over a series of transformations of the object, should be guaranteed. For example, an invariant may be that all states of threads executing an application or operating system should be in a certain position, such as visible and not outstanding.

Figure 1:
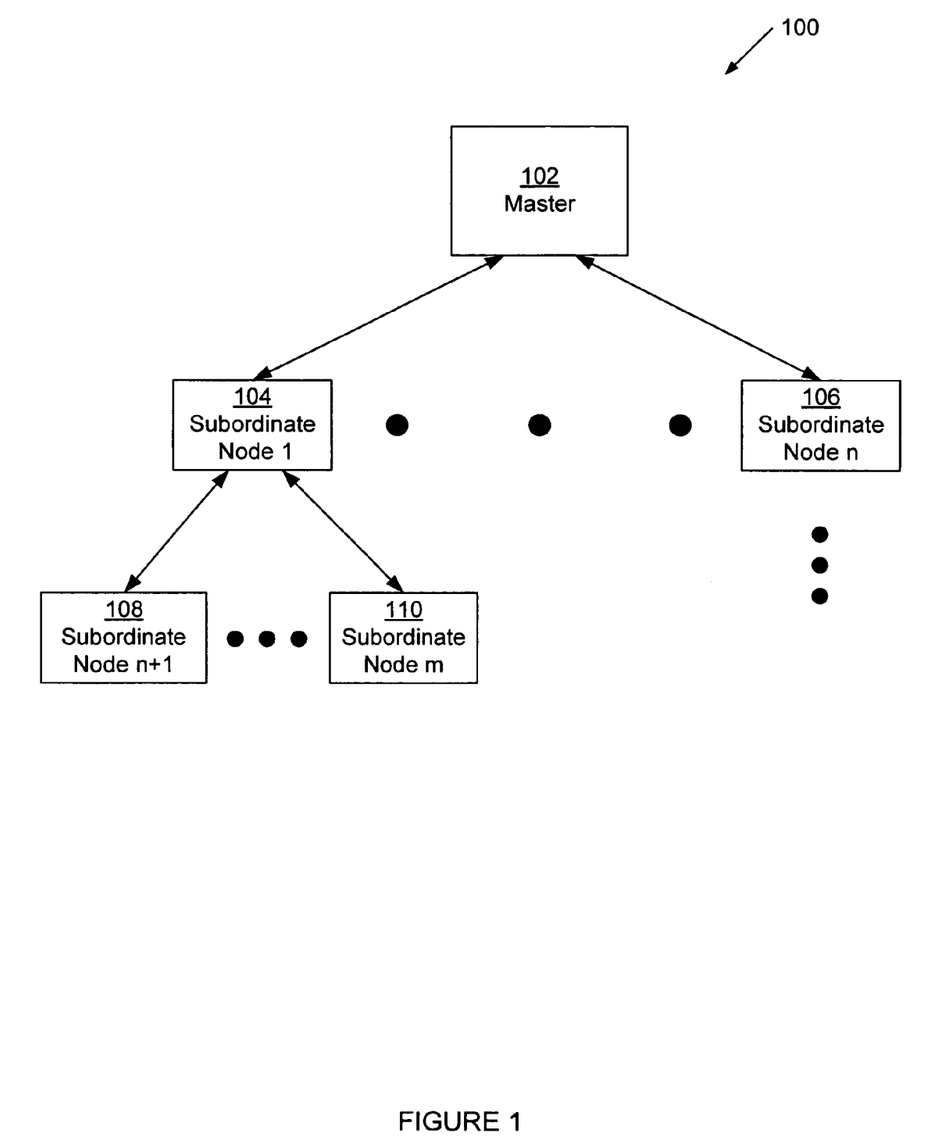
FIG. 1 shows a distributed computer system for computer system diagnostics in accordance with one embodiment of the invention.

FIG. 1 shows a distributed computer system (100) for computer system diagnostics in accordance with one embodiment of the invention. The distributed computer system (100) corresponds to virtually any type of interconnection of nodes (e.g., 102, 104, 106, 108, 110) in virtually any topology. For example, the nodes (e.g., 102, 104, 106, 108, 110) may be arranged in a star, a ring, a tree, etc. Additionally, the distributed computer system (100) may correspond to a multiple processors with shared memory system, several interconnected servers, or a group of computers connected over the Internet. Further, the distributed computer system (100) may include one or more subsystems in which the subsystem is of a different type and topology than the parent system.

Those skilled in the art will appreciate that while FIG. 1 shows a hierarchical structure (i.e., a tree) the hierarchical structure illustrates the relationships between the nodes. Accordingly, the hierarchical structure is not indicative of the actual topology of the distributed system.

As shown in FIG. 1, the distributed computer system (100) includes a master (102) and multiple subordinate nodes (e.g., 104, 106, 108, 110). Each of these aforementioned components will be described in more detail below.

In one embodiment of the invention, a master (102) may include the necessary hardware and/or software to start the safepoint process and to detect hardware or software failure in any of the nodes (e.g., 102, 104, 106, 108, 110). The master (102) may correspond to a particular thread, a particular node, or to multiple master nodes. In the scenario of multiple master nodes, each master node may include the functionality to communicate with other master nodes to allow for synchronizing the diagnostics.

In one embodiment of the invention, the master (102) is operatively connected, directly or indirectly, to one or more subordinate nodes (e.g., 104, 106, 108, 110). The subordinate nodes (e.g., 104, 106, 108, 110) include functionality to receive communication from the master (102) and respond to the master (102). Further, in one embodiment of the invention, each subordinate node (e.g., 104, 106, 108, 110) may also have one or more child nodes (e.g., 108, 110) and a parent node (e.g., 104, 102). For example, node 1 (104) is the parent of node n+1 (108) and node m (110). Accordingly, node n+1 (108) and node m (110) are child nodes of node 1 (104).

Those skilled in the art will appreciate that each node (e.g., 102, 104, 106, 108, 110) in the distributed computer system (102) may correspond to virtually any type of device, such as a server (i.e., web server, database server, etc.), personal computer, laptop computer, cell phone, personal digital assistant, embedded computer, etc.

Figure 2:
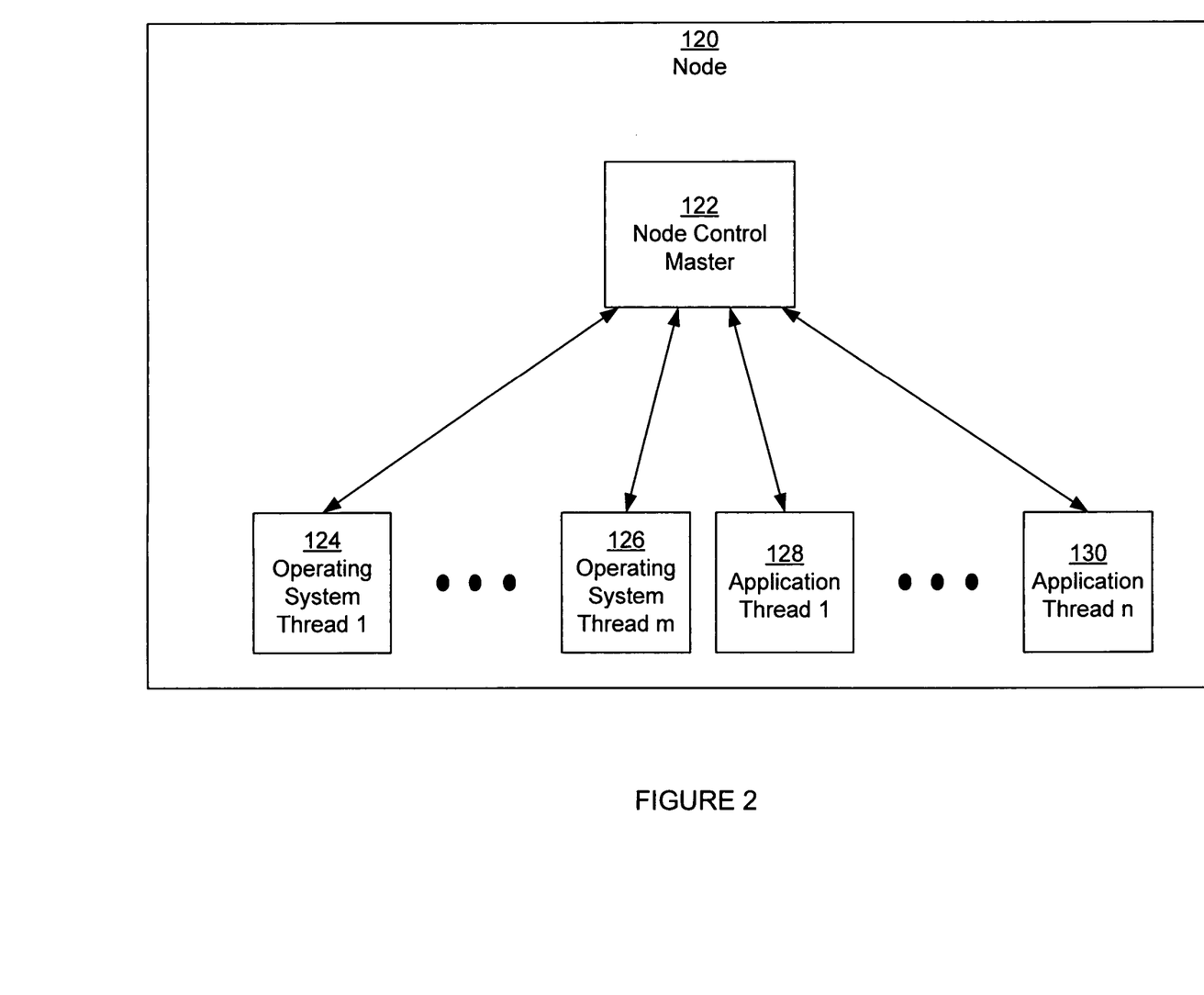
FIG. 2 shows a node in the distributed computer system in accordance with one embodiment of the invention.

FIG. 2 shows a node (120), such as nodes (102, 104, 106, 108, 110) shown in FIG. 1, in a distributed computer system in accordance with one embodiment of the invention. The node (120) includes a node control master (122), one or more operating system threads (e.g., 124, 126), and one or more application threads (e.g., 128, 130). Each of these aforementioned components will be described in more detail below.

In one embodiment of the invention, the node control master (122) corresponds to a parent thread, which is responsible for safepointing the node (120). The node control master (122) may correspond to one or more threads of the operating system or of an application executing on the node (120). Specifically, in one embodiment of the invention, the node control master (122) includes functionality to receive a safepoint command and a restart command from a parent node (e.g., node control master (122)) and forward the command and the message to child nodes and child threads (e.g., 124, 126, 128, 130).

The child threads of the node control master (122) include the operating system threads (e.g., 124, 126) and the application threads (e.g., 128, 130). The operating system threads (e.g., 124, 126) correspond to the threads required for executing the instructions of the operating system. The application threads (e.g., 128, 130) correspond to the threads which execute the instructions of any application(s) on the node. In one embodiment of the invention, embedded in the instructions for the operating system and the application is safepoint code. The safepoint code includes the instructions required for the thread to create a safepoint (as described below).

Figure 3:
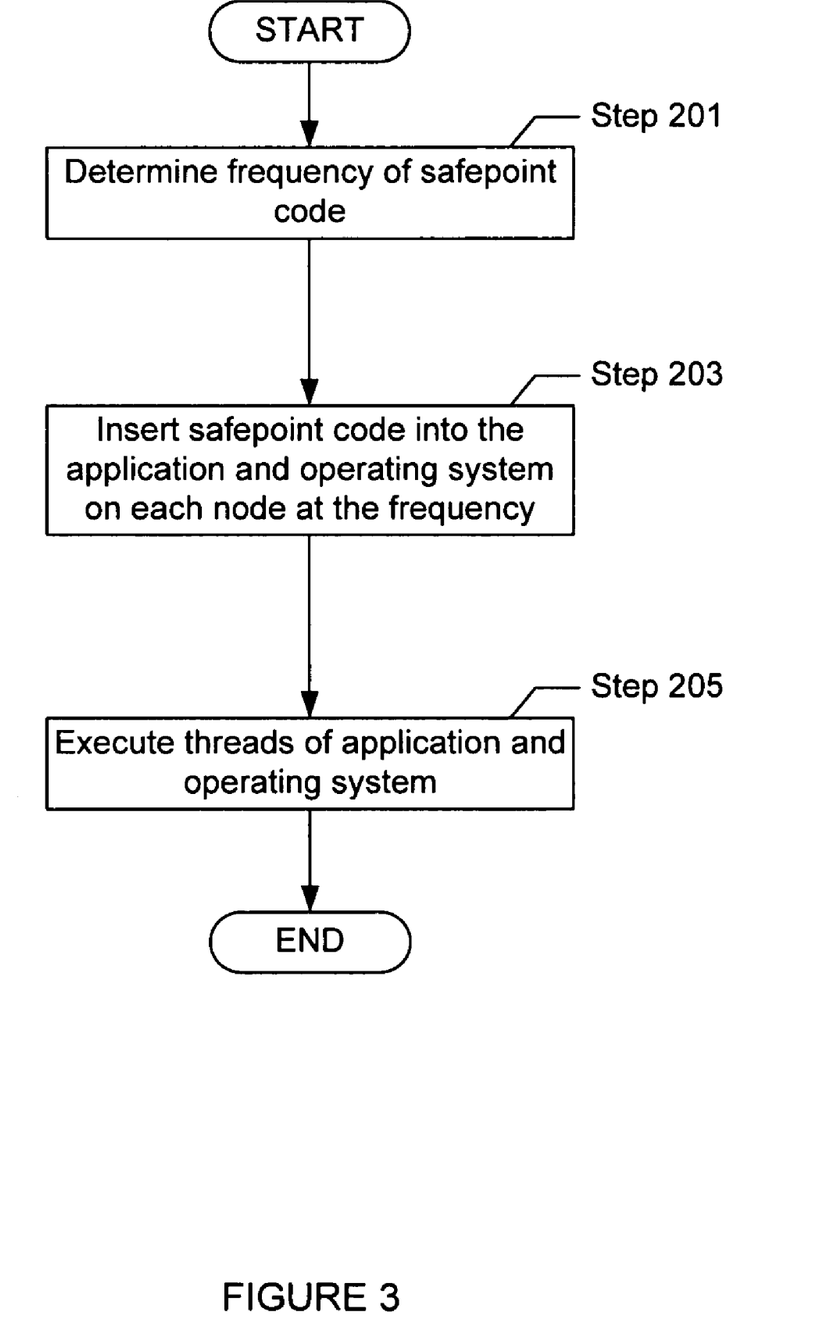
FIG. 3 shows a method for initializing a distributed computer system for computer system diagnostics in accordance with one embodiment of the invention.

FIG. 3 shows a method for initializing a distributed computer system for computer system diagnostics in accordance with one embodiment of the invention. Initially, in one embodiment of the invention, the frequency of safepoint code is determined (Step 201). The frequency of the safepoint code may be determined according to the use of the distributed computer system. For example, banking system may require that failure is detected earlier than in a system used for science. Likewise, the system used for science may require more throughput and may not be as concerned with constantly ensuring the distributed computer system is functioning properly. Thus, for example, the banking system may have a frequency of safepoint code for every 100 instructions, whereas the system used for science may have a frequency of every day. Accordingly, the frequency of the safepoint may be configurable in order to be appropriate for the use of the distributed system.

Next, in one embodiment of the invention, safepoint code is inserted into the instructions of the application and operating system on each node using the frequency (Step 203). The safepoint code may be inserted by the programmer designing the application or operating system, a compiler using dynamic code generation at compile time, an interpreter using dynamic code generation at runtime, etc. Further, in one embodiment of the invention, the safepoint code is inserted in a safe portion of the code and in a manner ensuring that there are not arbitrarily long number of instructions between safepoints, such as in loops with a large number of iterations. For example, the safepoint may be inserted so that critical sections, such as critical kernel loops, and time sensitive sections, such as within a trap handler, are not interrupted. Accordingly, the thread may be interrupted for the safepoint at a time in which the thread will not fail because of the interruption.

Continuing with FIG. 3, after the safepoint code is inserted into the application and the operating system on each node, the threads which execute the instructions of the operating system and application may be executed (Step 205). At this stage, the distributed computer system is ready for diagnostics in accordance with one embodiment of the invention.

Figure 4:
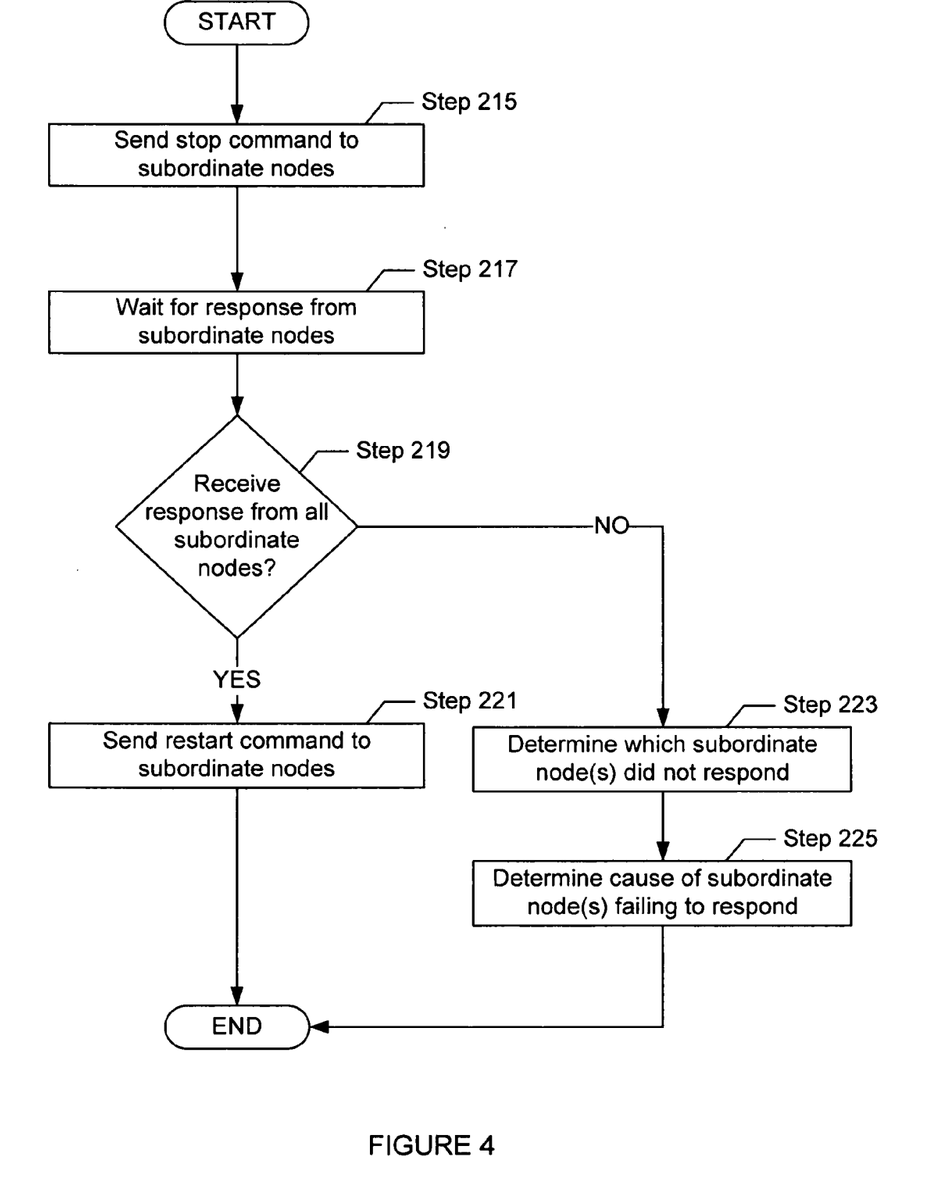
FIG. 4 shows a method for diagnosing a distributed computer system by a master in accordance with one embodiment of the invention.

FIG. 4 shows a method for diagnosing a distributed computer system at a master level in accordance with one embodiment of the invention. Initially, the master (e.g., 102 in FIG. 1) sends a stop command to subordinate nodes (e.g., 104, 106, 108, 110 In FIG. 1) (Step 215). The stop command may be propagated from the master to each subordinate node using the hierarchy (as described below in FIG. 5). If there are multiple masters, then the master nodes may synchronize sending the stop command.

Additionally, in one embodiment of the invention, the frequency of the stop command may be configurable. For example, as described above, certain uses of the distributed system require a safepoint more often then other uses of the distributed computer system.

Continuing with FIG. 4, once the master has sent a stop command, then the master may wait until the master receives a response from the subordinate nodes (Step 217). In one embodiment of the invention, the master only receives a response from the direct subordinates of the master in the system hierarchy when the children of the master receive a response from their subordinates.

Further, the master may wait until all subordinate nodes have responded with a safepoint message or for a certain period of time. In one embodiment of the invention, the safepoint message indicates that the subordinate nodes are executing the safepoint code.

In one embodiment of the invention, when the time period has elapsed, the master may determine whether the master node has received a response, directly or indirectly, from all the subordinate nodes (Step 219). Next, the response (or lack of response) is evaluated.

In one embodiment of the invention, if the master receives a response from all of the subordinate nodes, then the master node may send a restart command to the subordinate nodes (Step 221). The restart command may propagate from the master to each subordinate node using the system hierarchy (as described below in FIG. 5).

Alternatively, if the master has not received a response from all of the subordinate nodes, then the master may determine which subordinate node(s) did not respond (Step 223). Next, a determination may be made as to the cause for the subordinate node(s) failing to respond (Step 224). In one embodiment of the invention, if the failure is a hardware failure, then the subordinate node(s) may not respond at all. Alternatively, if the failure is a software failure, then the subordinate nodes may respond incorrectly.

Figure 5:
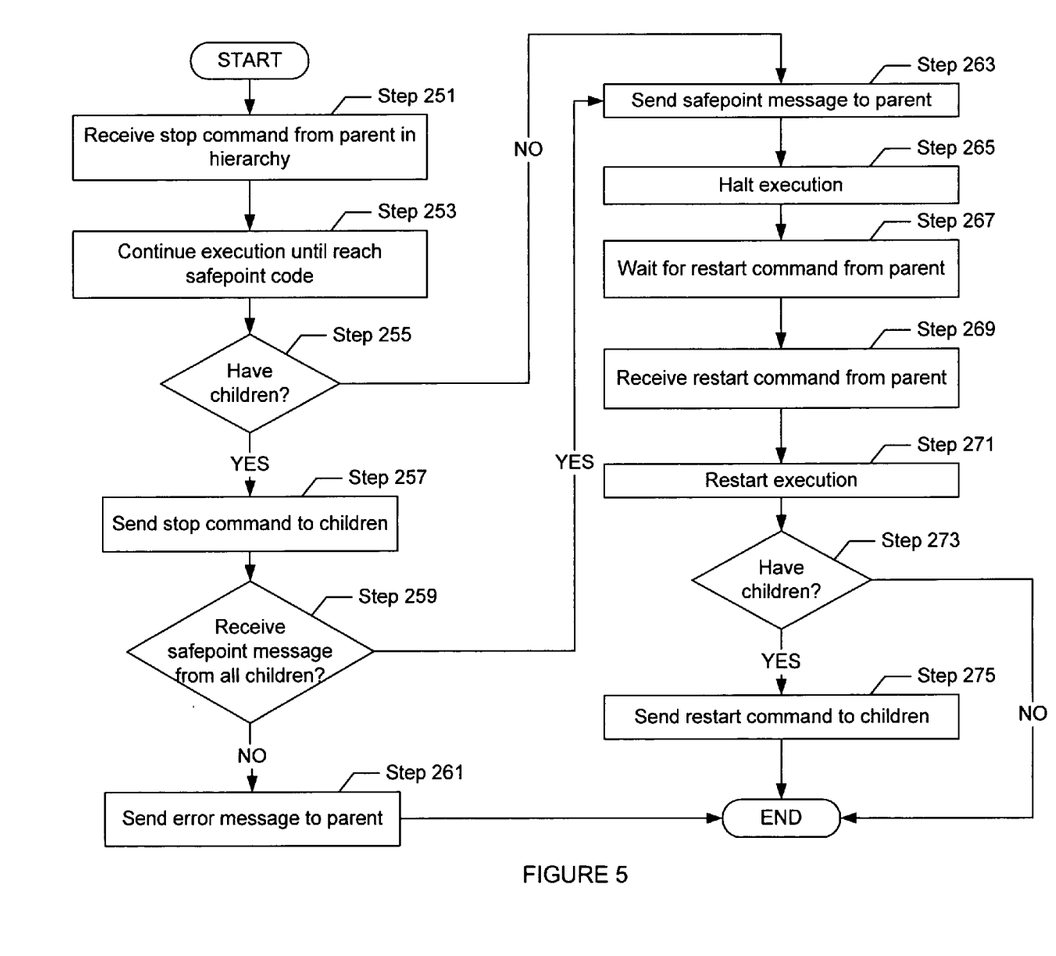
FIG. 5 shows a method for diagnosing a distributed computer system by a subordinate in accordance with one embodiment of the invention.

FIG. 5 shows a method for diagnosing a distributed computer system at a subordinate level in accordance with one embodiment of the invention. Specifically, FIG. 5 shows steps performed by a subordinate node (hereinafter referred to as a "current subordinate") in the system hierarchy in accordance with one embodiment of the invention. The current subordinate may be a node or a thread on a node in the hierarchy. Initially, a stop command is received by the current subordinate from a parent in the hierarchy (Step 251). The current subordinate continues execution until the safepoint code is reached (Step 251). Continuing execution maintains the cooperative process and assures that failure will not occur because of the diagnostics.

Once the safepoint code is reached, a determination is made as to whether the current subordinate has any children (Step 255). If there are children of the current subordinate, then in one embodiment of the invention, a stop command is sent to the children of the current subordinate (Step 257).

Next, the current subordinate waits until the current subordinate receives a safepoint message from the subordinates of the current subordinate (not shown). The current subordinate may wait until the safepoint message propagates from subordinates of the current subordinate through children of the current subordinate. In one embodiment of the invention, the current subordinate may wait for a specific period of time. When the specific period of time has elapsed, then the current subordinate may determine whether all safepoint messages have been received (Step 259). If all safepoint messages have not been received or if an error message was received, then the current subordinate may send an error message to the parent (Step 261).

Alternatively, in one embodiment of the invention, if the current subordinate does not have any children or if the current subordinate has received a safepoint message from the children of the current subordinate, then the current subordinate sends a safepoint message to the parent (Step 263).

In one embodiment of the invention, after sending the safepoint message, execution of the current subordinate is halted at the safepoint code (Step 265). The current subordinate may then wait for a restart command from the parent (Step 267). The restart command may be delayed until the master has received the safepoint message, issued the restart command, and the restart command has propagated to the current subordinate (as described in FIG. 4). Further, if there is a failure in the distributed computer system, then the current subordinate may not receive a restart command. Rather, the current subordinate may receive a command requesting that the current subordinate restart execution from a past safepoint.

Continuing with FIG. 5, once the current subordinate has received the restart command from the parent (Step 269), then the execution of the current subordinate may be restarted (Step 271). After restarting execution of the current subordinate, a determination is made as to whether the current subordinate has children (Step 273). If the current subordinate has subordinates, then the restart command may be sent to the children (Step 275) and subsequently propagated to the subordinates of the current subordinate.

By using a system hierarchy to propagate messages and commands, each thread and node in the system hierarchy needs to be aware only of the thread's or node's parent and subordinates. Those skilled in the art will appreciate that the master node, or any other node, may optionally be aware of all threads and nodes in the system and send the message directly to all threads and nodes.

Further, those skilled in the art will appreciate that the aforementioned commands and messages may be sent and received using virtually any technique known in the art, such as message passing, shared memory, signals, interrupts, etc.

Figure 6A:
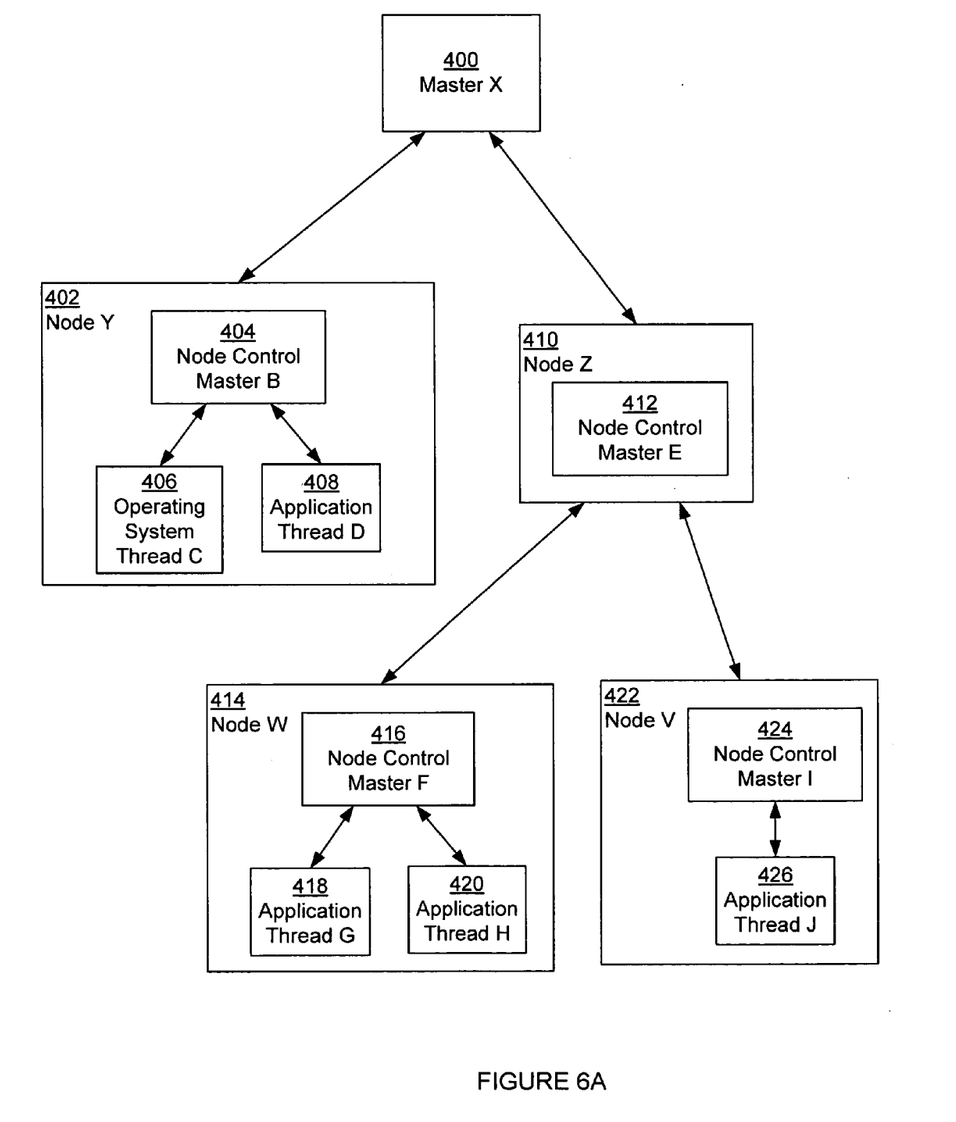
FIGS. 6A-6B shows an example of diagnosing a distributed computer system in accordance with one embodiment of the invention.
Figure 6B:
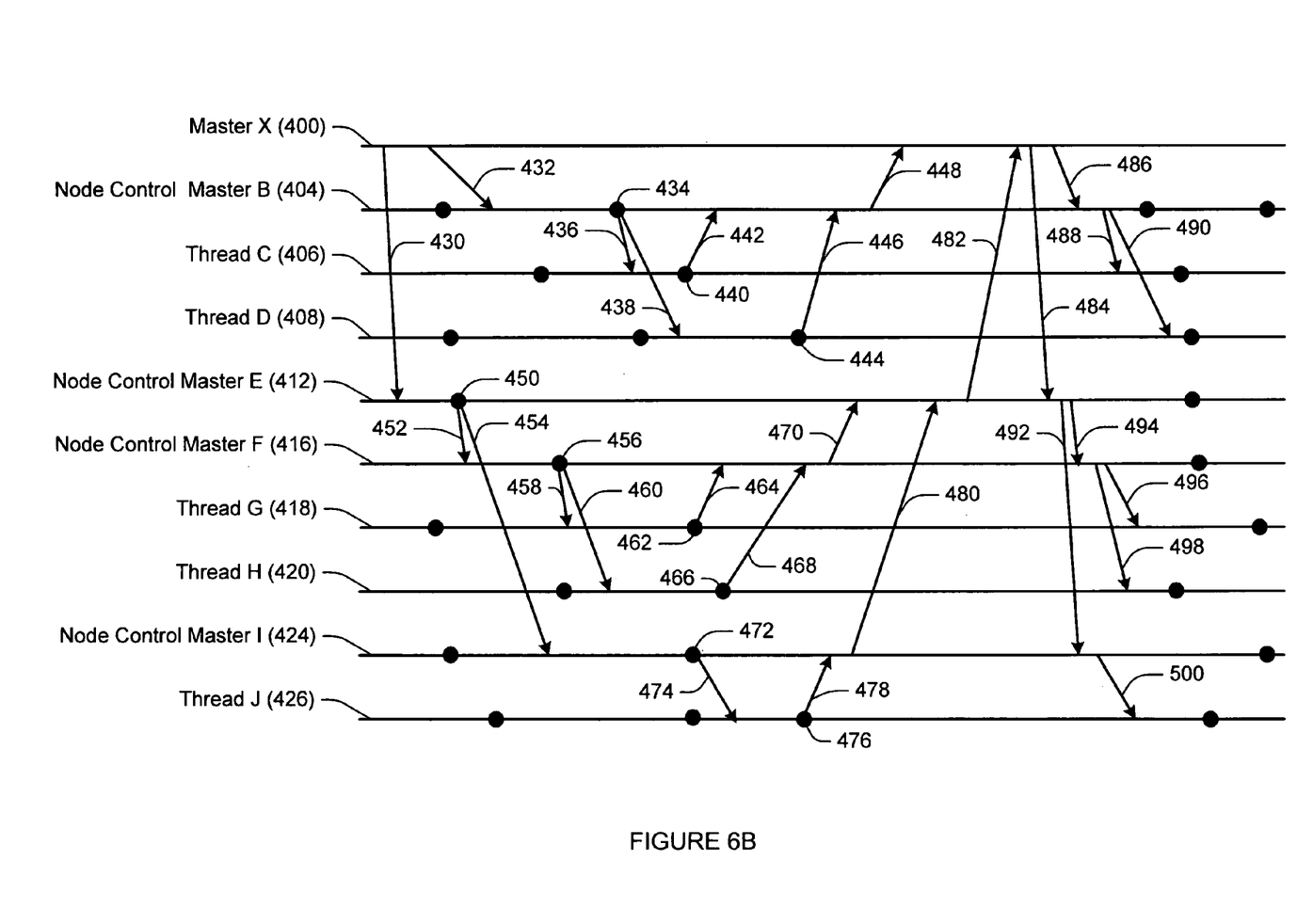

FIGS. 6A-6B shows an example of diagnosing a distributed computer system in accordance with one embodiment of the invention. Specifically, FIG. 6A shows an example of a hierarchical relationship in a distributed computer system.

In the example, master X (400) has two children, node Y (402) and node Z (410), with which master X (400) may directly communicate. Executing on node Y (402) is a node control master B (404) which has child threads, operating system thread C (406) and application thread D (408).

Continuing with the example of FIG. 6A, executing on node Z (410) is node control master E (412). Further, node Z (410) may also have two children nodes, node W (414) and node V (422). Executing on node W (414) is an node control master F (416), which has children threads, application thread C (418) and application thread H (420). Executing on node V (422) is node control master I (424), which has a child thread of application thread J (426).

FIG. 6B shows an example timing diagram for diagnosing the distributed computer system of FIG. 6A in accordance with one embodiment of the invention. Initially, the master X (400) sends a stop command (430, 432) to node Y via node control master B (404) and to node Z via node control master E (412). In one embodiment of the invention, node control master B (404) determines whether a stop command has been issued when node control master B (404) executes the safepoint code (434). Because such stop command has been issued, node control master B (404) sends a stop command (436, 438) to the children of node control master B (404), (i.e., thread C (406) and thread D (408)) and waits for a response. Likewise, thread C (406) continues execution until thread C (406) executes safepoint code (440). As part of thread C (406) executing the safepoint code, thread C (406) sends to node control master B (404) a safepoint message (442) and halts. In one embodiment of the invention, the safepoint message (442) indicates to node control master B (404) that thread C (406) has reached the safepoint (440).

Similarly, thread D (408) continues execution until thread D (408) executes the safepoint code (444). Upon execution of the safepoint code (444), thread D (408) sends a safepoint message (446) to node control master B (404) and halts. When node control master B (404) receives the safepoint message (442, 446) from both thread C (406) and thread D (408), node control master B (404) sends a safepoint message (448) to master X (400) and halts. Accordingly, through the safepoint message (448) from node control master B (404), master X (400) is aware that node control master B (404) and all subordinates of node control master B (404) have reached a safepoint (e.g., 434, 440, 444).

Continuing with example in FIG. 6B, in a manner similar to node control master B (404), when node control master E (412) executes the safepoint code (450), node control master E (412) determines whether a stop command has been received. Because such stop command (430) has been received, node control master E (412) sends a stop command (452, 454) to the subordinates of node control master E (412) through child node W (414) via node control master F (416) and through child node V (422) via node control master I (424).

Upon receiving the safepoint command (452), node control master F (416) continues executing until node control master F (416) executes the safepoint code (456). Because node control master F (416) has children, node control master F (416) sends a stop command (458, 460) to thread G (418) and thread H (420). Thread G (418) sends a safepoint message (464) to node control master F (416) when thread G (418) executes the safepoint code (462). Next, thread G (418) halts. Similarly, thread H (420) sends a safepoint message (468) to node control master F (416) when thread H (420) executes the safepoint code (466). Next, thread H (420) halts. Once node control master F (416) has received a response from both thread G (418) and thread H (420), node control master F (416) sends a safepoint message (470) to node control master E (412) and halts.

Likewise, when node control master I (424) receives the stop command from node control master E (412), node control master I (424) continues execution until the safepoint code (472). While executing the safepoint code (472), node control master I (412) determines that a stop command (454) has been received. Accordingly, node control master I (412) sends the stop command (474) to thread J (426). When thread J (426) executes the safepoint code (476), thread J (426) sends a safepoint message (478) to node control master I (424) and halts. Because thread J (426) is the only subordinate of node control master I (424), node control master I (424) sends a safepoint message (480) to node control master E (412) and node control master I (424) halts.

Continuing with FIG. 6B, at this stage, node control master E (412) has received a safepoint message from both node control master F (416) and node control master I (424). Thus, node control master E (412) is aware that all of the subordinates of node control master E (412) have reached a safepoint (e.g., 456, 462, 466, 472, 476). Accordingly, node control master E (412) sends a safepoint message (482) to master X (400) and halts.

Because master X (400) has received a safepoint message from the children (i.e., node Y (404) and node Z (410)) of master X (400), master X (400) is aware that all threads and all nodes are at a safepoint and have halted. Accordingly, the distributed computer system is as a whole at a safepoint.

Next, in one embodiment of the invention, master X (400) sends a restart command to propagate through the distributed system. Specifically, master X (400) sends a restart command (484, 486) to node control master B (404) and node control master E (412). Node control master B (404) sends the restart command (488, 490) to thread C (406) and thread D (408). Similarly, node control master E (412) sends the restart command (492, 494) to node control master F (416) and node control master I (424). Node control master F (416) sends the restart command (496, 498) to thread G (418) and thread H (420). Node control master I (424) sends the restart command to thread J (426). In one embodiment of the invention, upon receiving the restart command, each thread continues execution as normal. One skilled in the art will appreciate that instead of waiting until the entire distributed system is at a safepoint, the restart command may be sent at a point where a portion of the system hierarchy is determined safe to restart without affecting the other parties of the system hierarchy.

Figure 7:
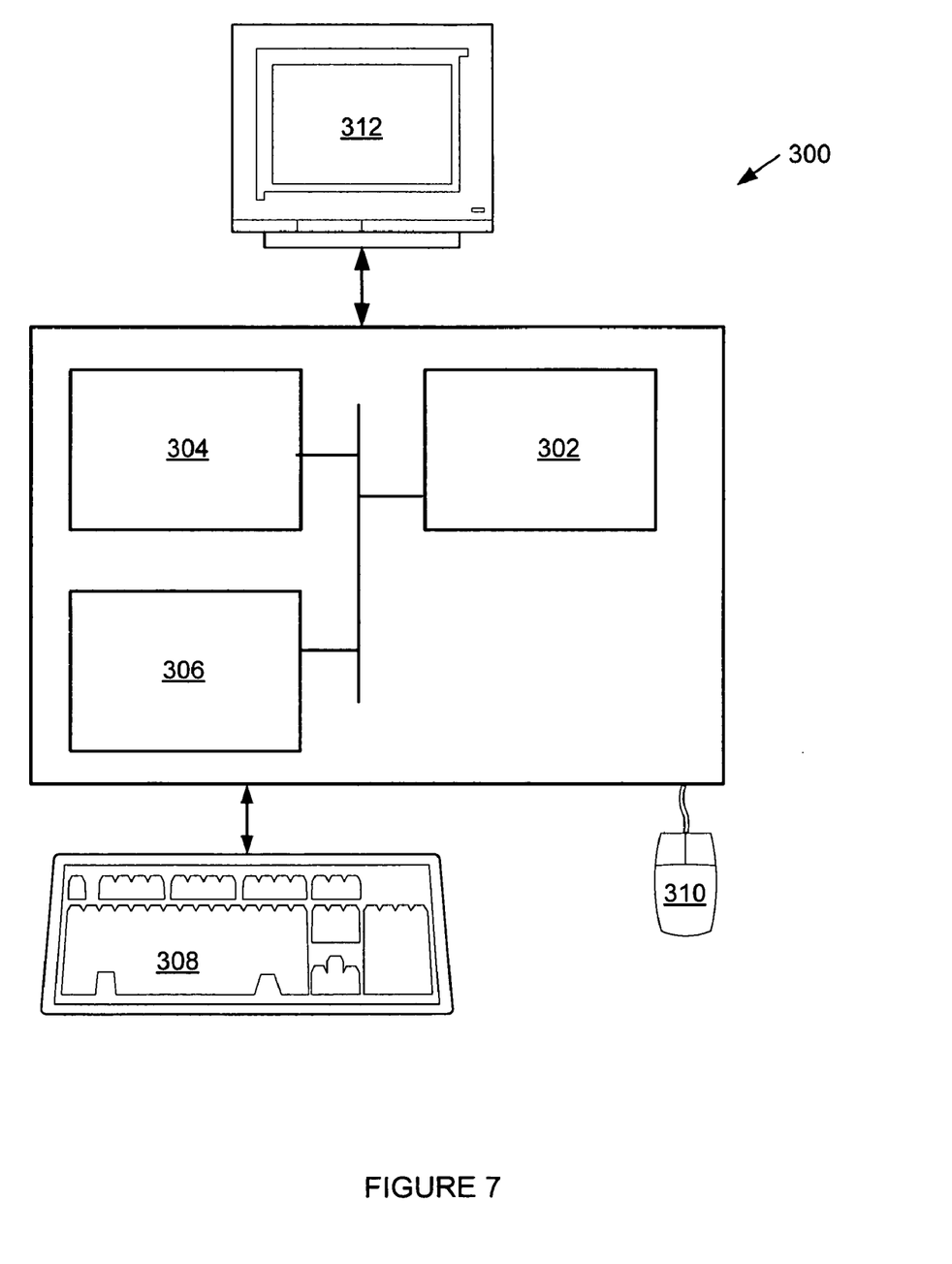
FIG. 7 shows computer system in accordance with one embodiment of the invention.

The invention may be implemented on virtually any type of computer regardless of the platform being used. For example, as shown in FIG. 7, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., a master node, a subordinate node, etc.) may be located on a different node within the distributed system. In one embodiment of the invention, the node corresponds to a computer system. Alternatively, the node may correspond to a processor with associated physical memory. Alternatively, the distributed system may correspond to multiple processors located on a single motherboard. Further, software instructions to perform embodiments of the invention may be stored on a computer readable medium such as a compact disc (CD), a diskette, a tape, a file, or any other computer readable storage device.

The present invention may include one or more of the following advantages. One or more embodiments of the invention are able to detect and distinguish between both hardware and software failure as well as all levels of software failure. Specifically, in one embodiment of the invention, by including safepoint code on all application and operating system threads, the master is able to diagnose a failure of any of the threads. Further, if no response is received from the node, then the master is able to determine a hardware failure from the node.

Additionally, by allowing the threads to continue execution and operating in a cooperative manner, embodiments of the invention provide a mechanism for detecting whether the threads are still executing and in a manner which will not crash the system. Specifically, by not forcing a thread to stop immediately, the thread must execute instructions in order to execute the safepoint code which is a part of the instruction set of the thread. Accordingly, in one embodiment of the invention, when the thread executes the safepoint code, then the master node is assured that the thread is still operating. Alternatively, in one embodiment of the invention, if a thread stops executing, or executes an infinite loop, then the thread will never reach the safepoint code. Therefore, the master may detect an error on the thread.

Further, by inserting the safepoint code directly into the instructions, the thread executes in a manner to avoid the critical sections allowing for the master node to send a stop command and not crash the thread or node by the command. Specifically, in one embodiment of the invention, the thread and node do not halt unless the thread or node is in a safe portion of the executing instructions to halt.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for safepointing a system comprising:
   receiving a stop command by an executing thread from a master, wherein the executing thread executes an operating system;
   continuing execution of the executing thread until a safepoint is reached after receiving the stop command;
   halting execution of the executing thread at the safepoint; and
   evaluating a response from the executing thread to diagnosis the system.

2. The method of claim 1, further comprising:
   inserting the safepoint in source code of the operating system.

3. The method of claim 2, wherein the safepoint comprises safepoint code inserted into source code executing on the system.

4. The method of claim 3, wherein safepoint code is inserted into source code using dynamic code generation.

5. The method of claim 1, wherein evaluating the response comprises detecting an error if a response is not received from the executing thread.

6. The method of claim 5, further comprising diagnosing the system using the error.

7. The method of claim 1, wherein the master comprises a plurality of master nodes.

8. The method of claim 7, wherein the plurality of master nodes synchronize sending the stop command.

9. The method of claim 1, wherein the frequency of the stop command is configurable.

10. The method of claim 1, further comprising:
    inserting the safepoint in an application;
    receiving a stop command by an application thread from the master;
    continuing execution of the application thread until a safepoint is reached after receiving the stop command;
    halting execution of the application thread at the safepoint; and
    evaluating a response from the application thread to diagnosis the system.

11. The method of claim 1, further comprising:
    receiving a restart command from the master by the executing thread if the response is received by each executing thread.

12. The method of claim 1, further comprising:
    forwarding the stop command from a node control master to a subordinate after reaching the safepoint.

13. The method of claim 12, further comprising:
    forwarding a restart command to the subordinate by the node control master.

14. The method of claim 12, wherein evaluating the response comprises detecting an error if a response is not received from the subordinate.

15. The method of claim 14, wherein the error is used to diagnosis the system.

16. A system for safepointing comprising:
    a plurality of subordinates configured to:
       receive a stop command,
       continue execution until reaching a safepoint after receiving the stop command,
       halt execution at the safepoint, and
       forwarding a response if the stop command is processed; and
    a master configured to:
       send the stop command to a subordinate in the plurality of subordinates, wherein the subordinate is an operating system thread; and
       determine whether the response is received from each subordinate in the plurality of subordinates,
       wherein the response from each subordinate is evaluated to diagnosis the system.

17. The system of claim 16, wherein the safepoint comprises safepoint code inserted into source code executing on the system.

18. The system of claim 17, wherein safepoint code is inserted into source code using dynamic code generation.

19. The system of claim 16, wherein the master is further configured to send a restart command to the subordinate if the response is received from each subordinate in the plurality of subordinates.

20. The system of claim 16, wherein evaluating the response comprises detecting an error if a response is not received from each subordinate.

21. The system of claim 20, wherein the error is used to diagnosis the system.

22. The system of claim 16, wherein the master comprises a plurality of master nodes.

23. The system of claim 22, wherein the plurality of master nodes synchronize sending the stop command.

24. The system of claim 16, wherein the frequency of the stop command is configurable.

25. The system of claim 16, further comprising:
   a node control master configured to:
      receive a stop command from the master, and
      forward the stop command to each subordinate in the plurality of subordinates after reaching the safepoint.

26. The system of claim 25, wherein the node control master is further configured to:
   forward a restart command to each subordinate in the plurality of subordinates.

27. A distributed system having a plurality of nodes comprising:
   a plurality of subordinates configured to:
      receive a stop command,
      continue execution until reaching a safepoint after receiving the stop command,
      halt execution at the safepoint, and
      forwarding a response if the stop command is processed; and
   a master configured to:
      send the stop command to a subordinate in the plurality of subordinates, wherein the subordinate is an operating system thread; and
      determine whether the response is received from each subordinate in the plurality of subordinates,
      wherein the response from each subordinate is evaluated to diagnosis the system.

* * * * *